(12) United States Patent
Abusleme et al.

(10) Patent No.: US 8,217,119 B2
(45) Date of Patent: Jul. 10, 2012

(54) ADDITIVES FOR HALOPOLYMERS

(75) Inventors: Julio A. Abusleme, Saronno (IT);
Marco Avataneo, Senago (IT);
Giancarlo Perfetti, Pogliano Milanese (IT)

(73) Assignee: Solvay Solexis S.p.A., Bollate (MI) (IT)

( * ) Notice: Subject to any disclaimer, the term of this patent is extended or adjusted under 35 U.S.C. 154(b) by 490 days.

(21) Appl. No.: 12/516,086

(22) PCT Filed: Nov. 26, 2007

(86) PCT No.: PCT/EP2007/062999
§ 371 (c)(1),
(2), (4) Date: May 22, 2009

(87) PCT Pub. No.: WO2008/065164
PCT Pub. Date: Jun. 5, 2008

(65) Prior Publication Data
US 2009/0326154 A1    Dec. 31, 2009

(30) Foreign Application Priority Data
Nov. 30, 2006  (IT) .............................. MI2006A2308

(51) Int. Cl.
C08L 27/00 (2006.01)
C08L 23/00 (2006.01)
(52) U.S. Cl. ............ 525/199; 525/88; 508/582; 568/677
(58) Field of Classification Search .................... 525/88, 525/199; 508/582; 568/677
See application file for complete search history.

(56) References Cited

U.S. PATENT DOCUMENTS

| | | | |
|---|---|---|---|
| 3,624,250 A | 11/1971 | Carlson | |
| 3,715,378 A | 2/1973 | Sianesi et al. | |
| 3,810,874 A | 5/1974 | Mitsch et al. | |
| 3,847,978 A | 11/1974 | Sianesi et al. | |
| 3,882,193 A | 5/1975 | Rice et al. | |
| 4,451,646 A | 5/1984 | Sianesi et al. | |
| 4,513,129 A | 4/1985 | Nakagawa et al. | |
| 4,721,795 A | 1/1988 | Caporiccio et al. | |
| 4,757,145 A | 7/1988 | Caporiccio et al. | |
| 5,258,110 A | 11/1993 | Sianesi et al. | |
| 5,300,587 A * | 4/1994 | Mascia et al. ............... | 525/359.3 |
| 5,463,006 A | 10/1995 | Abusleme et al. | |
| 5,597,880 A | 1/1997 | Abusleme et al. | |
| 5,744,651 A | 4/1998 | Marchionni et al. | |
| 5,969,192 A | 10/1999 | Marchionni et al. | |
| 6,107,393 A | 8/2000 | Abusleme et al. | |
| 6,160,051 A | 12/2000 | Tatsu et al. | |
| 6,342,569 B1 | 1/2002 | Manzoni et al. | |
| 6,448,319 B1 * | 9/2002 | Strepparola et al. ........... | 524/377 |
| 6,982,173 B2 | 1/2006 | Marchionni et al. | |
| 2004/0192974 A1 | 9/2004 | Navarrini et al. | |
| 2005/0192413 A1 | 9/2005 | Marchionni et al. | |
| 2009/0105420 A1 | 4/2009 | Abusleme et al. | |

FOREIGN PATENT DOCUMENTS

| | | |
|---|---|---|
| EP | 0482596 A2 | 4/1992 |
| EP | 1020490 A1 | 7/2000 |
| EP | 1454938 A1 | 9/2004 |
| GB | 1226566 A | 3/1971 |
| WO | WO 9108254 A1 * | 6/1991 |

OTHER PUBLICATIONS

U.S. Appl. No. 12/516,048, Avataneo et al., filed May 22, 2009.
U.S. Appl. No. 12/516,158, Marchionni et al., filed May 22, 2009.
Claudio Tonelli, Piero Gavezotti, & Ezio Strepparola, "Linear perfuoropolyether difunctional oligomers: chemistry, properties and applications", Journal of Fluorine Chemistry, 1999, vol. 95, p. 51-70.
ASTM D1238-01, Standard test method for melt flow rates of thermoplastics by extrusion plastometer, 2001, 14 pp.
ASTM D4065-01, Standard Practice for Plastics: Dynamic Mechanical Properties: Determination and Report of Procedures, Nov. 2001, 8 pp.
ASTM D3418-03, Standard Test Method for Transition Temperatures of Polymers by Differential Scanning Calorimetry—Edition Dec. 1, 2003—published Jan. 2004, 8 pp.

* cited by examiner

*Primary Examiner* — Kelechi Egwim
(74) *Attorney, Agent, or Firm* — Arent Fox LLP

(57) ABSTRACT

Polymeric compositions comprising:
1) at least one thermoprocessable semicrystalline halo-polymer;
2) an additive in amounts between 0.01 and 10% by weight of 1) one or more (per)fluoropolyether polymers of formula:

$$Q\text{-}O\text{-}[A\text{-}B]_z\text{-}[A\text{-}B']_{z'}\text{-}A\text{-}Q' \quad (I)$$

wherein:
$A = -(X)_a-O-A'-(X')_b-$ wherein $A'$ is a perfluoropolyether chain; $X$, $X' = -CF_2-$, $-CF_2CF_2-$, $-CF(CF_3)-$; $a$, $b = 0$ or $1$;
B derives from one or more olefins, of which at least one homopolymerizable by radical way, of formula:

$$-[(CR_1R_2-CR_3R_4)_j(CR_5R_6-CR_7R_8)_{j'}]- \quad (Ia)$$

wherein $j=1$-$30$, $j'=0$-$29$, with the proviso that $2<(j+j')<30$; $R_1$-$R_8$ = halogen, H, $C_1$-$C_6$ (per)haloalkyl, $C_1$-$C_6$ alkyl, or $C_1$-$C_6$ oxy(per)fluoroalkyl;
B'=(Ia) but at least one of $R_1$-$R_8$ has a meaning different from that in B, and $2 \leq (j+j') < 30$;
$z \geq 2$; $z'$ is 0 or an integer; $z$, $z'$ are such that the number average molecular weight of (I) is between 500 and 500,000;
Q, Q'=$C_1$-$C_3$ perfluoroalkyl; $C_1$-$C_6$ alkyl; or functional end group(s).

18 Claims, No Drawings

ADDITIVES FOR HALOPOLYMERS

CROSS-REFERENCE TO RELATED APPLICATIONS

This application is a U.S. national stage application under 35 U.S.C. §371 of International Application No. PCT/EP2007/062999 filed Nov. 29, 2007, which claims priority to Italian Application No. MI2006A002308 filed Nov. 30, 2006, these applications being incorporated herein by reference in their entirety for all purposes.

The present invention relates to polymeric compositions having an improved processability, in particular lower pressure and/or lower torque in extrusion, wherein the polymers are semicrystalline thermoprocessable.

In particular the present invention relates to compositions of thermoprocessable semicrystalline (halo)polymers containing, as additive, alternated blocks -A-B-A-B-A- polymers wherein A is a perfluoropolyether block and B is a block formed of repeating units deriving from halogenated and/or hydrogenated olefins.

Thermoprocessable semicrystalline halopolymers as ECTFE, TFE copolymers with perfluoroalkylvinylethers as MFA and PFA, PVDF (VDF homopolymer) are known in the prior art. These polymers are commonly used for producing manufactured articles by extrusion or injection molding, for example to produce pipes, films, coatings, etc. As known, the higher the polymer molecular weight, the better the mechanical properties of the manufactured article. However as the molecular weight becomes higher the melt viscosity of the polymer increases, causing difficulties in the processing of the melt polymers. As a matter of fact the extrusion of the polymers having high viscosity brings to a notable pressure increase in the extruder die. Under these severe conditions the polymers can degrade and/or give rise to manufactured articles having surface defects and/or in the bulk.

In the prior art to overcome these drawbacks, additives capable to improve the processability are generally used. However the additives industrially used for thermoprocessable semicrystalline polymers do not work for semicrystalline halogenated polymers.

Classes of additives used as processing aid of non thermoprocessable polymers, in particular for fluoroelastomers, are also known. However a high thermal stability is not requested to this class of industrially used additives. In fact the additives for fluoroelastomers are not used in the extrusion of thermoprocessable semicrystalline halopolymers. The latter are extruded, as known, at higher temperatures, generally higher than 200° C., compared to fluoroelastomers. The fluoroelastomers are generally processed at temperatures lower than 150° C., in particular lower than 100° C., to avoid the schorching in the extruder. Many additives used for the extrusion of polymers at lower temperatures, as those indicated above, are subjected to a high evaporation, or suffer a degradation. The latter phenomenon brings to an undesired discoloration of the manufactured article. Defects in the manufactured article bulk, as for example fractures (cracks, bubbles, etc.) and surface defects as roughness, streakings, can take place. What said above is more evident for thermoprocessable semicrystalline (per)fluoropolymers wherein the extrusion is carried out at even higher temperatures, of at least 250° C.

Another characteristic requested to the additives for semicrystalline polymers is that they must be able to improve the processability without however modifying the polymer bulk properties, as the mechanical properties.

Another parameter to be taken into account in the choice of the additive, is the easiness to be mixed with the polymeric matrix. As a matter of fact, high shear extruders are generally used for obtaining a good additive distribution in the polymeric matrix. However it must be noted that the polymer granulation, generally carried out on the polymer powders before adding the additive, is performed in low shear extruders. This is a disadvantage: it would be advisable to use the same estruder, in particular a low shear type.

The need was therefore felt to have available additives for thermoprocessable semicrystalline polymers showing the following combination of properties:

high thermal stability at high temperatures, preferably higher than 200° C., more preferably higher than 250° C.;

ability to reduce the die pressure and/or the torque of the extruder screw during the extrusion without a substantial reduction of the flow-rate;

substantially homogeneous distribution of the additive in the semicrystalline polymer even when low shear extruders are used;

additive effectiveness even when used in low amounts;

no substantially modification of the properties of the polymer, in particular mechanical.

The Applicant has surprising and unexpectedly found particular additives solving the technical problem.

An object of the present invention are polymeric compositions comprising:
1) a thermoprocessable semicrystalline halopolymer;
2) 0.01-10% by weight of 1) of an additive formed by one or more (per)fluoropolyether polymers of formula (I)

$$Q\text{-}O\text{-}[A\text{-}B]_z\text{-}[A\text{-}B']_{z'}\text{-}A\text{-}Q' \quad (I)$$

wherein:

A is $-(X)_a-O\text{-}A'\text{-}(X')_b-$ wherein A' is a perfluoropolyether chain comprising one or more repeating units selected from $(CF_2O)$, $(CF_2CF_2O)$, $(CF_2CF_2CF_2O)$, $(CF_2CF_2CF_2CF_2O)$, $(CF(CF_3)O)$, $(CF(CF_3)CF_2O)$, $(CF_2CF(CF_3)O)$, having a number average molecular weight between 66 and 50,000; X, X', equal to or different from each other, are selected from $-CF_2-$, $-CF_2CF_2-$, $-CF(CF_3)-$; a, b, equal to or different from each other, are integers equal to 0 or 1 with the proviso that the block A linked to the end group Q-O— has a=1 and the block A linked to the end group Q' has b=0;

B is a block formed of units deriving from one or more olefins, wherein at least one of them is homopolymerizable by radical route, having formula:

$$-[(CR_1R_2-CR_3R_4)_j(CR_5R_6-CR_7R_8)_{j'}]- \quad (Ia)$$

wherein j is an integer from 1 to 30, j' is an integer from 0 to 29, with the proviso that (j+j') is higher than 2 and lower than 30; $R_1$, $R_2$, $R_3$, $R_4$, $R_5$, $R_6$, $R_7$, $R_8$, equal to or different from each other, are selected from halogen, preferably F, Cl; H; $C_1$-$C_6$ (per)haloalkyl, wherein the halogen is preferably F, Cl; $C_1$-$C_6$ alkyl, optionally containing heteroatoms, as O, N, S; $C_1$-$C_6$ oxy(per)fluoroalkyl; said substituents $R_1$-$R_8$ optionally containing one or more functional groups;

B' is a block deriving from one or more olefins and has formula (Ia) but having at least one of the substituents $R_1$ to $R_8$ different than in block B, (j+j') being higher than or equal to 2 and lower than 30;

z is an integer higher than or equal to 2; z' is 0 or an integer; z, z' are such that the number average molecular weight of the polymer of formula (I) is between 500 and 500,000, preferably from 1,000 to 80,000, still preferably from 5,000 to 60,000;

Q and Q', equal to or different from each other, are selected from perfluoroalkyl end groups from 1 to 3 carbon atoms, one fluorine atom can be substituted by one chlorine or hydrogen atom; $C_1$-$C_6$ non fluorinated alkyls; or functional end groups —(CFW)-Dq-Tk wherein W=F, $CF_3$, k is an integer ranging from 1 to 4, preferably 1 or 2, q is equal to 0 or 1, D is a bridging group.

Preferably the sum of the component 1) and of the component 2) is 100% by weight.

The thermoprocessable semicrystalline polymers have a second melting temperature and/or a second melting heat per gram of polymers (enthalpy) higher than 1 J/g, preferably higher than 4 J/g, more preferably higher than 8 J/g, at Differential Scanning Calorimetry (DSC) according to the ASTM D 3418 method with a heating speed of 10° C./min. Preferred polymers have a high molecular weight having a melt flow index lower than 50 g/10 min, preferably lower than 10 g/10 min, more preferably lower than 5 g/10 min, measured according to ASTM D-1238 with a load of 5 kg at different temperatures depending from the polymers. For example the temperature is 275° C. for the ECTFE polymers, 230° C. for VDF polymers, 300° C. for ETFE polymers, 372° C. for the TFE perfluorinated semicrystalline copolymers.

Component 1) are, for example, obtainable by:
polymerization of one or more F and/or Cl atoms-containing olefinic monomers, optionally in the presence of non halogenated olefins;
polymerization of H-containing fluorinated olefinic monomers with perfluorinated olefinic monomers.

Examples of fluorine and/or chlorine atoms-containing olefinic monomers are: $C_2$-$C_8$ perfluoroolefins; $C_2$-$C_8$ hydrogenated fluoroolefins; $C_2$-$C_8$ chloro- and/or bromo-fluoroolefins; perfluoroalkylvinylethers $CF_2$=CFOX, wherein X is a $C_1$-$C_6$ perfluoroalkyl, $C_1$-$C_9$ perfluorooxyalkyl having one or more ether groups; perfluorodioxoles.

Examples of non halogenated olefins are olefins having from 2 to 8 carbon atoms, for example ethylene, propylene; acrylic monomers as methyl methacrylate, n-butyl acrylate; vinylic monomers as vinyl acetate.

Preferred monomers are: tetrafluoroethylene (TFE), hexafluoropropene (HFP), hexafluoroisobutene as $C_2$-$C_8$ perfluoroolefins; among the $C_2$-$C_8$ hydrogenated fluoroolefins, vinyl fluoride (VF), vinylidene fluoride (VDF), trifluoroethylene, perfluoroalkylethylene $CH_2$=CH—$R_f$, wherein $R_f$ is a $C_1$-$C_6$ perfluoroalkyl; among $C_2$-$C_8$ chloro- and/or bromo-fluoroolefins, chlorotrifluoroethylene (CTFE) and bromotrifluoroethylene; among perfluorovinylethers $CF_2$=CFOX, wherein X is a $C_1$-$C_6$ perfluoroalkyl, trifluoromethyl or pentafluoropropyl can be mentioned, when X=$C_1$-$C_9$ perfluorooxyalkyl having one or more ether groups, perfluoro-2-propoxy-propyl can for example be mentioned; among perfluorodioxoles, 2,2,4-trifluoro-5-trifluoromethoxy-1,3-dioxole (TTD) can be mentioned.

The more preferred semicrystalline halopolymers are:
(a) TFE copolymers with ethylene, and/or propylene and/or isobutylene, optionally containing one or more other comonomers, in amounts generally between 0.1% and 30% by moles; for example a perfluoroalkylethylene $CH_2$=CH—$R_f$, wherein $R_f$ is a $C_1$-$C_6$, preferably $C_4$ perfluoroalkyl in amounts generally between 0.1-10% by moles. See for example U.S. Pat. No. 3,624,250 and U.S. Pat. No. 4,513,129;
(b) polyvinylidenfluoride, optionally containing one or more comonomers in amounts generally between 0.1% and 15% by moles, as for example hexafluo-ropropene, tetrafluoroethylene, trifluoroethylene, chlorotrifluoroethylene, acrylic monomers;
(c) polychlorotrifluoroethylene, optionally containing one or more comonomers, in amounts generally between 0.1% and 10% by moles, as perfluorodioxoles, perfluoroalkylvinylethers, ethylene, acrylic monomers. See for example U.S. Pat. No. 6,342,569;
(d) polymers of chlorotrifluoroethylene (CTFE) with ethylene (E), optionally with propylene and/or isobutylene in addition or in substitution of E; said polymers optionally containing one or more other comonomer, in amounts between 0.1% and 30% by moles with respect to the total amount of E+CTFE, preferably between 0.1% and 15% by moles, for example hexafluoroisobutene, perfluoropropylvinylether or one or more acrylic monomers, for example n-butylacrylate. See for example U.S. Pat. No. 6,107,393;
(e) polyvinylchloride (PVC) polymers, chlorinated polyvinylchloride (CPVC), polyvinylidene chloride (PVDC). These polymers optionally contain one or more monomers, preferably selected from ethylene, vinyl acetate, acrylic or methacrylic monomers;
(f) TFE polymers with one or more fluorinated monomers, in amounts between 0.1% and 10% by moles, selected from hexafluoropropene, and perfluoroalkylvinylethers as perfluoromethyl-, perfluoroethyl-, perfluoropropyl-vinyl ether. See for example U.S. Pat. No. 5,463,006.

In class a) TFE polymers with E, are preferred.

In class (b) the VDF homopolymer and VDF/HFP copolymers, wherein HFP is in amounts 1% 10% by moles, are preferred.

In class (d) the preferred ECTFE copolymers contain:
(a) 10-70% by moles of ethylene, preferably 30-90%,
(b) 30-90% by moles of CTFE, preferably 45-65%,
optionally containing one or more fluorinated comonomers (c1) and/or hydrogenated comonomers (c2) in amounts preferably from 0.1 to 10% by moles, more preferably 0.2-5% by moles, with respect to the total content of the monomers (a) and (b).

Among the fluorinated comonomers (c1), (per)fluoroalkylvinylethers, perfluoroalkylethylenes (as perfluorobutylethylene), (per)fluorodioxoles as those described in U.S. Pat. No. 5,597,880, vinylidenfluoride (VdF) can be mentioned. Among these comonomers (c1) the perfluoro-propylvinylether of formula $CF_2$=CFO—$C_3F_7$ is preferred.

Preferably the hydrogenated comonomers (c2) have general formula

$$CH_2=CH-(CH_2)_n-R_1 \quad (A)$$

wherein $R_1$=—$OR_2$, or $(O)_tCO(O)_pR_2$ wherein t and p are integers equal to 0.1 and $R_2$ is a $C_1$-$C_{20}$ hydrogenated radical from 1 to 20 C atoms, of alkyl type, linear or branched when possible, or cycloalkyl, optionally containing heteroatoms and/or chlorine atoms, preferably the heteroatoms being O or N, $R_2$ optionally containing one or more functional groups, preferably selected from OH, COOH, epoxide, ester and ether, $R_2$ optionally containing double bonds, or $R_2$ is H, n is an integer between 0 and 10; preferably $R_2$ is of alkylic type from 1 to 10 C atoms containing functional groups of hydroxide type, n is an integer between 0 and 5.

The preferred comonomers (c2) of formula (A) are for example selected from the following classes:
1) Acrylic monomers having general formula:

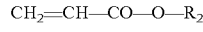

$$CH_2=CH-CO-O-R_2$$

wherein $R_2$ has the above mentioned meaning. Ethylacrylate, n-butylacrylate, acrylic acid, hydroxyethylacrylate, hydroxypropylacrylate, (hydroxy)-ethylhexylacrylate, etc. can for example be mentioned.

2) Vinylether monomers having general formula:

$$CH_2=CH-O-CO-R_2$$

wherein $R_2$ has the above mentioned meaning. Propylvinylether, cyclohexyl-vinylether, vinyl-4-hydroxybutylether, etc. can for example be mentioned.

3) Vinyl monomers of the carboxylic acid having general formula:

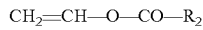
$$CH_2=CH-O-CO-R_2$$

wherein $R_2$ has the above mentioned meaning. Vinylacetate, vinylpropionate, vinyl-2-ethylhexanoate, etc. can for example be mentioned.

4) Unsaturated carboxylic acids having general formula:
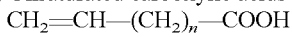
$$CH_2=CH-(CH_2)_n-COOH$$
wherein n has the above mentioned meaning. For example vinylacetic acid, etc.

As comonomer (c2) n-butylacrylate is preferred.

Particularly preferred as comonomers (c1), (c2) are perfluoroalkylvinylethers, preferably propyl, or acrylic monomer, preferably n-butyl acrylate.

The ECTFE melt index is preferably at least 0.01, more preferably at least 0.05, still more preferably at least 0.1 g/10 min. The ECTFE melt index is preferably at most 100, more preferably 50 at most, still more preferably 20 g/10 min at most. The ECTFE melt index is measured according to the modified test ASTM 1238, carried out at 275° C., with a 5 kg load. The ECTFE copolymer has a melting point preferably of at least 150° C. and of 265° C. at most. The melting point is determined by Differential Scanning Calorimetetry (DSC) with a heating rate of 10° C./min according to ASTM D 3418.

In class (f) preferred copolymers are TFE with
2-5% by weight of perfluoropropyl-vinylether; or with
2-11% by weight of perfluoromethyl vinylether, optionally containing perfluoropropyl vinylether in amounts between 0.1% and 3% by weight.

Preferred classes are (a), (b), (d), more preferred is (d). In the latter the preferred is copolymer E/CTFE or ECTFE copolymers containing fluorinated comonomers (c2).

In component 2) of formula (I), (j+j') can be higher than 2 and lower than 5, or (j+j') can be higher than or equal to 5 up to 30. The latter ones are preferred. More preferably, component 2) has second melting enthalpy (ΔH) higher than 1 J/g of polymer, at the DSC according to ASTM D 3418 with a heating rate of 10° C./min, wherein the calculation of the second melting enthalpy (ΔH) is approximately carried out between 50° C. and 200° C. When second melting ΔH is higher than 1 J/g the component 2) is generally solid at room temperature and do not show any elastomeric properties.

In formula (I) Q and Q' can be $-CF_3$, $-C_2F_5$, $-C_3F_7$, $-CF_2H$, $-CF_2CF_2H$, $-CFHCF_3$, $-CF_2Cl$, $-C_2F_4Cl$, $-CH_3$, $-C_2H_5$, $-C_3H_7$. The bridging group D of the component 2) is bivalent or polyvalent, preferably trivalent, radical. Examples of bivalent D are groups of the linear aliphatic type $-(CH_2)_{m'}-$, wherein m' is an integer from 1 to 20, optionally containing heteroatoms. Examples of trivalent D can be (alkylen)cycloaliphatic, (alkylen)aromatic groups, optionally containing heteroatoms. The bond D can be a linear and branched polyalkylenoxy chain, in particular containing repeating units of the $CH_2CH_2O$, $CH_2CH(CH_3)O$, $(CH_2)_3O$, $(CH_2)_4O$ type. In D the number of carbon atoms of the cycloaliphatic groups ranges from 3 to 20, preferably from 4 to 6, and that of the aromatic groups from 6 to 20, preferably from 6 to 12; the group D can optionally be formed also by combining among each other the aliphatic, cycloaliphatic and aromatic groups as defined above.

The bridging group D can be linked to the perfluoromethylene group of the perfluoropolyether chain by carbon bonds or $-O-$; $-CONR-$, wherein R has the following meanings: H, $C_1-C_{15}$ alkyl, $C_3-C_{15}$ cycloaliphatic or $C_5-C_{15}$ aromatic groups; $-C(O)O-$; $-COS-$; $-CO-$; one heteroatom; or triazine groups, or aromatic heterocyclic groups from 5 to 6 atoms containing 2 or more heteroatoms, equal to or different from each other.

The groups $T_k$ of the component 2) can for example be: $-SH$, $-SR'$, $-NR'_2$, $-SiR'_dL_{3-d}$, wherein L is an OR' group, d is an integer between 0 and 3, $-CN$, $-NCO$, $-CH=CH_2$,

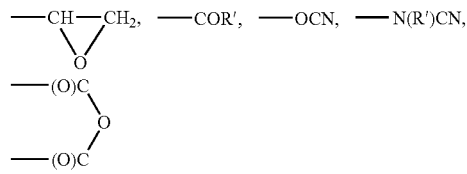

$-CHO$, $-CH(OCH_3)_2$, $-C(OCH_3)=NH$, $-C(NH_2)=NH$, $-CH(OH)CH_2OH$, $-CH(CH_2OH)_2$, $-CH(COOH)_2$, $-CH(COOR')_2$, $-CH(CH_2NH_2)_2$, $-NH_2$, $-NHR'$, $-N(R')_2$, $-CH(CN)_2$, $-CH(CH_2OCH_2CH=CH_2)_2$, $-C(OH)_2CF_3$, $-OH$, $-CH_2OH$; $-COY$ with $Y=OH$, $OR'$, $CF_3$, $NH_2$, $NHR'$, $NR'R''$, halogen; wherein R', R'' are an alkyl, cycloaliphatic or aromatic group, R', R'' can optionally contain fluorine; $T_k$ can also be an aryl radical formed of one or more aromatic rings, optionally condensed, for example triazine, pyridine, quinoline, benzothiazole, optionally substituted with one or more groups as for example alkyls, nitro; or an heterocyclic radical as for example phosphazene, dioxane.

In the component 2), B derives from one or more homopolymerizable olefins by radical route, for example tetrafluoroethylene (TFE), ethylene (E), vinylidene fluoride (VDF), chlorotrifluoroethylene (CTFE), optionally in the presence of other non-homopolymerizable olefins by radical route as hexafluoropropene (HFP), (per)fluorovinylethers, etc.

Block B' derives from one or more homopolymerizable or non homopolymerizable olefins by radical route. The olefins indicated for B can also be used for obtaining the block B'. The preferred olefins for B' are those preferred of B.

B and B' blocks containing units deriving from perfluorinated olefins are preferred. Examples of these olefins are TFE, TFE and HFP mixtures. Other preferred B, B' blocks are those containing units deriving from at least one homopolymerizable perfluorinated olefin by radical route, for example TFE, and at least a non perfluorinated olefin, for example ethylene, vinylidene fluoride (VDF). Polymers (I) wherein B' is absent (z'=0) are more preferred.

The compounds of formula (I) wherein the blocks B are formed of TFE are particularly preferred.

B can optionally contain pendant functional groups when the $R_1-R_8$ substituents contain one or more functional groups, for example the groups defined for -Tk, preferably OH, CN, $OCOR_a$, COX wherein $X=OR_a$, OH, $NR_a'R_a''$, halogen, wherein $R_a$, $R_a'$, $R_a''$ are $C_1-C_6$ alkyls. However as functional groups in $R_1-R_8$ those not decomposing at the extrusion temperatures of the polymer component 1) are preferred.

The total weight of the blocks B, B' is generally lower than 70% of the total weight of the polymer (I).

In the component 2), A' has preferably a number average molecular weight between 300 and 10,000, more preferably between 500 and 5,000. A is preferably selected from the following structures:

(1) $—(X)_aO—[(CF_2O)_n(CF_2CF_2O)_m(CF_2CF_2CF_2O)_p(CF_2CF_2CF_2CF_2O)_q—](X')_b—$ wherein X, X', equal to or different from each other, are $—CF_2—$, $—CF_2CF_2—$;

a, b, are as defined above; m, n, p, q are integers, zero comprised, such that m/n is between 0.1-10 when n is different from zero; (p+q)/(n+m+p+q) is between 0 and 0.05, (n+m+p+q) being different from 0.

(2) $—(X)_aO—[(CF_2O)_n(CF_2CF_2O)_m(CF_2CF_2CF_2O)_p(CF_2CF_2CF_2CF_2O)_q(CF(CF_3)O)_u(CF_2CF(CF_3)O)_v]—(X')_b$ wherein X, X', equal to or different from each other, are $—CF_2—$, $—CF(CF_3)—$, $—CF_2CF_2—$;

a, b are as defined above;

m, n, p, q, u, v are integers including zero, such that (p+q)/(v+m) is between 0 and 0.05 when (v+m) is different from zero; v/(n+m+u) is lower than 50 when (n+m+u) is different from zero.

Preferably the Q, Q' end groups are $C_1$-$C_3$ perfluoroalkyls, $C_1$-$C_3$ alkyls, $—CF_2H$.

As component 2) the polymer $$Q\text{-}O\text{-}[A\text{-}B]_z\text{-}A\text{-}Q' \qquad (I)$$

is particularly preferred, wherein:

Q, Q' are selected from $—CF_3$, $—CF_2Cl$, $—CF_2CF_2Cl$, $—CF_2H$;

B is $—[CF_2—CF_2]_j$ wherein j is higher than 5;

A=$—(CF_2)O—[(CF_2O)_n(CF_2CF_2O)_m(CF_2CF_2CF_2O)_p(CF_2CF_2CF_2CF_2O)_q—](CF_2)_b—$ wherein m, n, p, q are integers zero comprised such that m/n is between 0.1 and 10 when n is different from zero; (p+q)/(n+m+p+q) is between 0 and 0.05 and the molecular weight of A is between 500 and 3,000; z is between 2 and 40.

The compositions of the present invention unexpectedly and surprisingly show an improved processability, a lower pressure and/or a lower torque in extrusion with respect to the semicrystalline halopolymer. A lower torque, the flow-rate being equal, is advantageous since it requires a lower energetic consumption. A lower die pressure is advantageous since it allows the extrusion of highly viscous materials, also in standard low shear extruders, with the obtainment of articles having high mechanical properties.

Component 2) is stable at high temperatures, also higher than 200° C. No degradation phenomena of the additive (generation of smokes or carbon residues in the granules) and/or discoloration of the semicrystalline polymer component 1) have been observed.

Preferred amounts of component 2) are comprised from 0.05% to 5%, preferably 0.1%-3%.

The compositions of the invention are prepared by mixing the components 1) and 2), for example, in a rotary blend or directly in the extruder optionally granulating to obtain pellets, and then extruding the blend to obtain the final articles. The components can be mixed in the extruder. Preferably the components 1) and 2) are in solid form, preferably in the form of powders. By extrusion pipes, films, sheets, cables, filaments, etc., are obtained. Manufactured articles can be also obtained by injection molding, blow molding, compression molding, thermomolding, etc.

Component 2) can be used also as additive for semicrystalline polyolefins, for example polypropylene (PP), polyethylene (PE) having a high and low density, ethylene copolymers, propylene copolymers, optionally containing a dienic monomer as for example butadiene, norbornene. See the examples. Also in this case a lower torque has been obtained.

The component 2) can be prepared, for example, by starting from peroxidic perfluoropolyethers with a process comprising the following steps:

(a) reaction of a peroxidic perfluoropolyether comprising at least one of the following units $(CF_2O)$, $(CF_2CF_2O)$, $(CF_2CF_2CF_2O)$, $(CF_2CF_2CF_2CF_2O)$, $(CF(CF_3)O)$, $(CF(CF_3)CF_2O)$, $(CF_2CF(CF_3)O)$, having an peroxidic content (PO), defined as g of active oxygen (molecular weight=16) in 100 g of perfluoropolyether peroxide, between 0.1 and 4, preferably between 0.1 and 3.5, with at least one homopolymerizable olefin by radical route, optionally in the presence of one or more non homopolymerizable olefins by radical route, at temperatures between 125° C. and 280° C. and at a pressure between 1 bar and 50 absolute bar, by feeding the olefin until obtaining a polymer having a predetermined PO, the ratio between the moles of the olefin and the moles of peroxidic units (moles of $—O—O—$ bonds) of the perfluoropolyether ranging from 1 to 100;

(b) interruption of the olefin feeding and treatment of the polymer obtained in (a) until the removal of the peroxidic content;

(c) treatment of the polymer obtained in (b) by a neutralization reaction of the acid end groups or by functionalization reactions of the end groups obtaining the polymers of formula (I).

During the synthesis a polymeric mixture is obtained wherein the various molecules of polymer (I) have j and j' different from each other. Consequently the average value (j+j') of the final polymeric mixture can also be a fractional number.

In step (a) optionally homopolymerizable olefins by radical route can be used. The ratio between the total moles of the olefins and the moles of peroxidic units (moles of $—O—O—$ bonds) of perfluoropolyether is preferably between 1 and 50, more preferably between 1 and 25. The temperature in step a) is preferably between 180° C. and 230° C. The pressure in step a) is preferably between 1 and 10 absolute bar.

Step (a) can optionally be carried out in the presence of a fluorinated solvent. The amount of the latter is such as to have a peroxidic perfluoropolyether content between 1% and 50% by weight with respect to the total weight of the solvent plus peroxidic perfluoropolyether, preferably 5%-30% by weight. Preferably the solvent solubilizes the peroxidic perfluoropolyether at the reaction temperature of step a) and is not reactive towards the radical species formed in the reaction of step a), for example (per)fluoroalkyl or perfluorooxyalkyl radicals. Preferably the solvent is selected from perfluorocarbons, hydrofluorocarbons, perfluoropolyethers and hydrofluoropolyethers, more preferably perfluoropolyethers, such as Galden®, and hydrofluoropolyethers such as H-Galden®. When a solvent is used in step a), the starting peroxidic perfluoropolyether can have an active oxygen (PO) content even up to 5.

The starting peroxidic perfluoropolyether can contain only units selected from $(CF(CF_3)O)$, $(CF(CF_3)CF_2O)$, $(CF_2CF(CF_3)O)$, $(CF_2O)$. In general the end groups of the peroxidic perfluoropolyether are $C_1$-$C_3$ (per)fluoroalkyls, optionally containing one or more chlorine atoms, preferably one Cl atom, or functional end groups as acyl fluorides, fluoroformates and ketones. The peroxidic perfluoropolyether preferably is selected from the following classes:

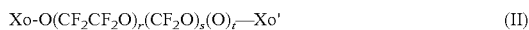

$$Xo\text{-}O(CF_2CF_2O)_r(CF_2O)_s(O)_t\text{-}Xo'  \quad (II)$$

wherein

Xo and Xo', equal to or different from each other, are —$CF_2Cl$, —$CF_2CF_2Cl$, —$CF_3$, —$CF_2CF_3$, —$CF_2COF$, —$COF$;

r, s and t are integers such that the number average molecular weight is generally in the range 400-150,000, preferably 500-80,000; r/s is between 0.1 and 10 s being different from zero; t is an integer such that the PO is in the above defined range.

The peroxidic perfluoropolyethers of formula (II) can be prepared by tetrafluoroethylene oxypolymerization by following the teachings of U.S. Pat. No. 3,715,378, U.S. Pat. No. 4,451,646, U.S. Pat. No. 5,258,110, U.S. Pat. No. 5,744,651;

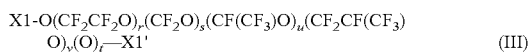

$$X1\text{-}O(CF_2CF_2O)_r(CF_2O)_s(CF(CF_3)O)_u(CF_2CF(CF_3)O)_v(O)_t\text{-}X1' \quad (III)$$

wherein

X1 and X1', equal to or different from each other, are —$CF_2Cl$, —$CF_2CF_2Cl$, —$CF_2CF_3$, —$CF_3$, —$C_3F_7$, —$CF(CF_3)COF$, —$COF$;

r, s, t, u, v are integers such that the number average molecular weight is in the range 500-150,000, preferably 700-80,000; r can also be 0; v/(r+s+u) is lower than 100, preferably lower than 50 and t is a number such that the PO is within the above defined range.

The peroxidic perfluoropolyethers of formula (III) can be prepared by perfluoropropene oxypolymerization optionally in admixture with tetrafluoroethylene, by following the teachings of U.S. Pat. No. 5,000,830 and U.S. Pat. No. 3,493,530;

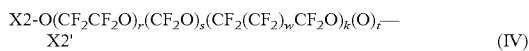

$$X2\text{-}O(CF_2CF_2O)_r(CF_2O)_s(CF_2(CF_2)_wCF_2O)_k(O)_t\text{-}X2'  \quad (IV)$$

wherein

X2 and X2', equal to or different from each other, are —$CF_2COF$, —$COF$;

w=1 or 2;

r, s, t and k are integers such that the number average molecular weight is in the range 700-100,000, preferably 700-80,000; r/s is between 0.2 and 10, k/(r+s) is lower than 0.05 and t is an integer number such that the PO is as defined above.

The peroxidic perfluoropolyethers of formula (IV) can be obtained according to the teachings of the patent application US 2005/0192413.

Preferably the peroxidic perfluoropolyethers are those of the classes (II) and (III), more preferably class (II).

The peroxidic perfluoropolyethers can be subjected, before step (a) to a partial reduction of the peroxidic bonds in order to reach the predetermined average molecular weight and/or to regulate the content of peroxidic units (PO) by chemical reduction, preferably with hydrogen in the presence of catalyst, such as Pd, Pt, Ru, according to the teachings reported in U.S. Pat. No. 4,451,646, U.S. Pat. No. 3,847,978 herein incorporated by reference; or by thermal treatment according to what reported in U.S. Pat. No. 3,715,378, herein incorporated by reference. The thermal treatment can be carried out for example at temperatures between 100° C. and 250° C. Alternatively to the thermal treatment a photochemical treatment using UV light can be carried out, optionally in the presence of an inert solvent as for example an halogenated solvent.

In step (a) the ratio between the olefins and the peroxidic units (PO) is a function of the percentage of olefinic units in the final polymer (I). Generally the ratio depends also on the olefin solubility in the reaction mixture, the temperature, the pressure, the olefin reactivity and the presence of other olefins. When very reactive olefins are used, the molar ratios are preferably lower than 50. The same takes place when the temperature and pressure allow to have a high concentration of olefin in liquid phase.

Step (a) can be carried out under batch-, semibatch- or continuous-conditions. In the batch process the peroxidic PFPE and the olefins are fed into the reactor before the reaction starts. In the semibatch process the peroxidic PFPE is fed into the reactor before the reaction starts while the olefin, or the mixture of olefins, is continuously fed during the reaction. Also the inverse process can be used. In the continuous process the peroxidic PFPE and the olefins are continuously fed and contemporaneously the reaction mixture is taken off from the reactor.

The feeding of the olefin in the continuous or semibatch processes can be carried out with a flow-rate constant or not. In the latter case the feeding can be at gradient, by steps, etc., with the condition that the ratio between the total moles of the olefin and the moles of peroxidic units (moles of —O—O— bonds) is in the above range.

When a semibatch or a batch is used, it is preferable to carry out the reaction by using a temperature gradient, for example starting from a predetermined temperature, for example 180° C. reaching 230° C. The time to reach the highest temperature of the gradient is generally of 3 to 8 hours.

When more olefins are used in step (a) it is possible to feed them in a sequential way or not. In this case the polymers of formula (I) contains the blocks B'.

In step (a) the PO is determined according to the method reported below.

Step (a) can be carried out in the presence of UV radiations having a wavelength preferably comprised between 200 nm and 350 nm, at temperatures generally between −100° C. and +100° C., preferably between −80° C. and +80° C., more preferably between −60° C. and +60° C. In this embodiments the ratio between the moles of the olefin and the moles of peroxidic units of the peroxide (—O—O— bond moles) is preferably between 1 and 75. A solvent transparent to UV is preferably used in this embodiment. Examples of solvent are those listed under a) provided that they are transparent to UV. The pressure is preferably lower than 5 absolute bar, by using a batch or semibatch process.

Step (b) is carried out to completely remove the peroxidic content of the polymer obtained in step (a). Complete removal of the peroxidic content means that peroxide content is under the analytical limit by using the determination method indicated in the characterization in the examples.

Step (b) can be carried out by photochemical- or thermal-route. The latter is preferred and is carried out, for example, by heating the mixture obtained in step a) at temperatures between 200° C. and 280° C., preferably 220-250° C., until the disappearance of the peroxide content. See for example U.S. Pat. No. 3,715,378 and EP 1,454,938, herein incorporated by reference. If the step b) is carried out by photochemical route in the presence of UV radiations, the temperatures are preferably between −100° C. and +100° C.

Alternatively, in step (b) the peroxide content of the polymer obtained in (a) can be reduced by chemical reduction reactions with a reducing agent until the complete removal of the residual peroxidic content. See for example U.S. Pat. No. 4,451,646 and U.S. Pat. No. 3,847,978 herein incorporated by reference. The chemical reduction can be carried out, for example, by using a reducing agent as hydrogen, optionally in the presence of a catalyst, for example Pd, Pt, Ru; primary or secondary alcohols as methanol, ethanol, isopropanol, simple hydrides as LiH, KH, AlH$_3$, or complex hydrides as LiAlH$_4$, NaBH$_4$, or SO$_2$, HI, alkaline metal salts at temperatures between −30° C. and 250° C., optionally in the presence of a solvent.

The chemical reduction carried out in (b) leads to the formation of two functional end groups for each reduced peroxidic bond. Therefore the higher the PO of the mixture obtained in step (a), the higher the functionality of the polymer obtained after chemical reduction (b). This means that the PO value of the mixture obtained in step (a) determines the functionality f desired of the polymer (I). Functionality means the number of functional end groups Q, Q' for molecule.

When one does not wish to obtain functional end groups, i.e. f=0, it is preferable to carry out step (a) until obtaining a polymer (I) having a PO near zero, generally lower than 0.05, preferably lower than 0.02, more preferably lower than 0.01 and carry out the subsequent step (b) by thermal or photochemical treatment.

In step (c) the acid end groups as for example acylfluorides, ketones, are subjected to neutralization according to various methods. For example it can be mentioned fluorination reaction, for example as described in GB 1,226,566, decarboxylation, as described in U.S. Pat. No. 5,969,192, alkylation reactions as for example described in U.S. Pat. No. 6,982,173 or in US 2004/0192974, said patents being herein incorporated by reference. The reaction chosen for the neutralization mainly depends on the olefins used in step (a). In case of perfluorinated olefins it is preferable to carry out fluorination, preferably with elementary fluorine. For an hydrogenated olefin, the decarboxylation or alkylation reaction is preferred.

For the fluorination reaction, it is preferable to subject the product obtained in (b) to hydrolysis before step (c). In this way the acyl fluoride end groups are transformed into —COOH end groups. After fluorination —CF$_3$, —C$_2$F$_5$, —C$_3$F$_7$, —CF$_2$Cl, —C$_2$F$_4$Cl are obtained as end groups. When decarboxylation in step (c) is used, the —COOH end groups are transformed into —CF$_2$H, —CF$_2$CF$_2$H, —CF(CF$_3$)H and the terminal end groups Q, Q' of the obtained polymer are —CF$_2$H, —CF$_2$CF$_2$H, —CF(CF$_3$)H, optionally in addition to —CF$_3$, —C$_2$F$_5$, —C$_3$F$_7$, —CF$_2$Cl, —C$_2$F$_4$Cl. When alkylation reaction is used, the acyl fluoride end groups are transformed into —CH$_3$, —C$_2$H$_5$, —C$_3$H$_7$ and the terminal end groups Q, Q' are —CH$_3$, —C$_2$H$_5$, —C$_3$H$_7$, optionally in addition to —CF$_3$, —C$_2$F$_5$, —C$_3$F$_7$.

Alternatively, step (c) can be carried out by subjecting the polymer obtained in (b) to one or more functionalization reactions by means of known reactions, for example by using the reactants or the reaction conditions as described hereinafter, thus obtaining a polymer (I) having the following functional end groups -D$_q$-T$_k$.

| | -D$_q$-T$_k$ | Reactant |
|---|---|---|
| 1... | —CONHCH$_2$—CH=CH$_2$ | H$_2$NCH$_2$—CH=CH$_2$ |
| 2... | —CONH(CH$_2$)$_3$CO$_2$H | H$_2$N(CH$_2$)$_3$CO$_2$H |
| 3... | —CON(CH$_3$)CH$_2$CH$_2$OH | HN(CH$_3$)CH$_2$CH$_2$OH |
| 4... | —CONHCH$_2$CH$_2$NH$_2$ | H$_2$NCH$_2$CH$_2$NH$_2$ |
| 5... | —CONHCH$_2$CH$_2$SH | H$_2$NCH$_2$CH$_2$SH |
| 6... | —CONH(CH$_2$)$_3$Si(OCH$_3$)$_3$ | H$_2$N(CH$_2$)$_3$Si(OCH$_3$)$_3$ |
| 7... | —CONH—C$_6$H$_4$—OH (meta) | HO—C$_6$H$_4$—NH$_2$ (meta) |
| 8... | —CONH—C$_6$H$_4$—CH$_2$CO$_2$H | H$_2$N—C$_6$H$_4$—CH$_2$CO$_2$H |
| 9... | —CONH—C$_6$H$_3$(OH)$_2$ (2,5-dihydroxy) | HO—C$_6$H$_3$(OH)—NH$_2$ |
| 10... | —CONH—C$_6$H$_4$—Si(CH$_2$)$_2$OC$_2$H$_5$ | H$_2$N—C$_6$H$_4$—Si(CH$_2$)$_2$OC$_2$H$_5$ |
| 11... | —CONH—C$_6$H$_4$—CH$_2$CH=CH$_2$ | H$_2$N—C$_6$H$_4$—CH$_2$CH=CH$_2$ |

-continued
| | $-D_q-T_k$ | Reactant |
|---|---|---|
| 12... | 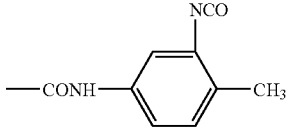 | 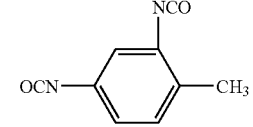 |
| 13... | 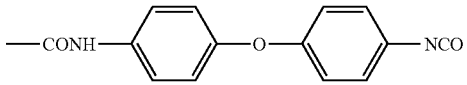 | 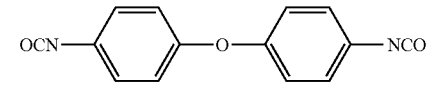 |
| 14... | 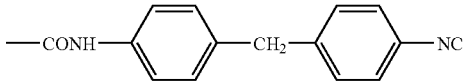 | 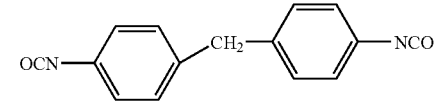 |
| 15... | 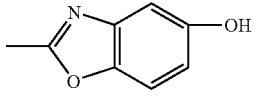 | (1) 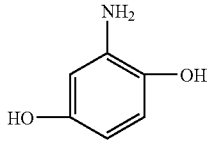<br>(2) Heating |
| 16... | 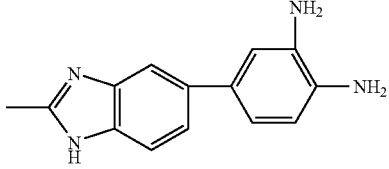 | (1) 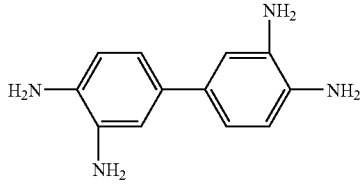<br>(2) Heating |
| 17... | 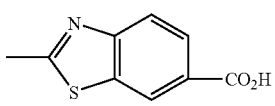 | (1) 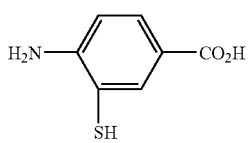<br>(2) Heating |
| 18... | 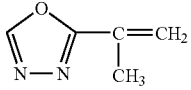 | (1) $H_2NNHCOC(CH)_3=CH_2$<br>(2) Dehydration |
| 19... | —$CO_2CH_2C(CH_3)_2CH_2OH$ | $HOCH_2C(CH_3)_2CH_2OH$ |
| 20... | —$CO_2CH_2CH(OH)CH_3$ | 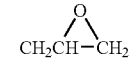 |
| 21... | —$CO_2CH_2CH=CH_2$ | $CH_2=CHCH_2OH$ |
| 22... | —CN | (1) $NH_3$<br>(2) Dehydration |
| 23... | 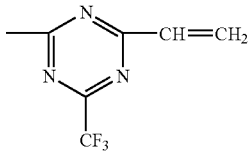 | (1) $NH_3$<br>(2) Dehydration<br>(3) <br>(4) $(CH_2=CHCO)_2O$ |
| 24... |  | Compound 22 + $NH_3$ |

-continued

| -D$_q$-T$_k$ | Reactant |
|---|---|
| 25 ... —CH$_2$OCH$_2$-(benzo[1,3]dioxol-5-yl) | (1) LiAlH$_4$<br>(2) ClCH$_2$-(benzo[1,3]dioxol-5-yl) |
| 26 ... —CH$_2$OCH$_2$CH(—O—)CH$_2$ (glycidyl ether) | (1) LiAlH$_4$<br>(2) Epibromohydrin |
| 27 ... —CH$_2$—O—CH$_2$CH=CH$_2$ | (1) LiAlH$_4$<br>(2) CH$_2$=CHCH$_2$Br |
| 28 ... —CH$_2$OCO-(2-aminophenyl) | (1) LiAlH$_4$<br>(2) isatoic anhydride |
| 29 ... —CH$_2$OSO$_2$F | (1) LiAlH$_4$<br>(2) CF$_3$SO$_2$F + (C$_2$H$_5$)$_3$N |
| 30 ... —CH$_2$OCN | (1) LiAlH$_4$<br>(2) NCCl + (C$_2$H$_5$)$_3$N |
| 31 ... —CH$_2$O-(4-aminophenyl) | (1) Compound 29 + NaO-(4-nitrophenyl)<br>(2) H$_2$ |
| 32 ... —CH$_2$O-(4-isocyanatophenyl) | Compound 31 + phosgene |
| 33 ... —CH$_2$O-(phthalic anhydride-5-yl) | (1) Compound 29 + NaO-(3,4-dicarboxyphenyl) (CO$_2$H$_3$)<br>(2) Hydrolysis<br>(3) Acetic Anhydride |
| 34 ... —CH$_2$O-C$_6$H$_4$-O-C$_6$H$_4$-NCO | (1) Compound 29 + NaO-C$_6$H$_4$-O-C$_6$H$_4$-OH<br>(2) ClCN + triethylamine |
| 35 ... —C(NH$_2$)=NH | Compound 22 + NH$_3$ |
| 36 ... —CH$_2$NCO | (1) Compound 29 + NH$_3$<br>(2) COCl$_2$ |
| 37 ... —CH$_2$NHCH$_3$ | Compound 29 + CH$_3$NH$_2$ |
| 38 ... —CH$_2$N-(norbornene dicarboximide) | (1) Compound 29 + NH$_3$<br>(2) norbornene dicarboxylic anhydride |

-continued

| | -$D_q$-$T_k$ | Reactant |
|---|---|---|
| 39... | (imide-CH₂-N linked norbornane with -Si(CH₃)₂OCOCH₃) | (1) Compound 38 + HSi(CH₃)₂OCOCH₃ + H₂PtCl₆ |
| 40... | —CH₂OCOC(CH₃)=CH₂ | (1) LiAlH₄<br>(2) CH₂=C(CH₃)COCl |
| 41... | —CH₂I | Compound 29 + NaI |
| 42... | —CH₂SH | (1) Compound 29 + CH₃COSNa<br>(2) Hydrolysis |
| 43... | —CH₃N⁺≡C⁻ | (1) Compound 29 + NH₃<br>(2) HCO₂CH₃<br>(3) COCl₂ + (C₂H₅)₃N |
| 44... | —NCO | (1) NaN₂<br>(2) Heating |
| 45... | —COC₆H₅ | Cd(C₆H₅)₂ |
| 46... | —C(CH₃)₂OH | (1) CH₂MgBr<br>(2) H⁺ |
| 47... | —CHO | LiAlH₄ |
| 48... | —C(CH₃)=CH₂ | Compound 46 + P₂O₅ |
| 49... | —CH₂N(CN)CH₃ | Compound 37 + ClCN + (C₂H₅)₃N |
| 50... | —I | (1) Ag₂O<br>(2) I₂ |
| 51... | —CH=CH₂ | Compound 47 + CH₂=P(C₆H₅)₃ |
| 52... | —C(OCH₃)=NH | Compound 22 + CH₂OH + (C₂H₅)₃N |
| 53... | —CH₂SO₂Cl | Compound 42 + Cl₂ + H₂O |
| 54... | —CH(OCH₃)₂ | Compound 47 + CH₃OH + acid |
| 55... | —CH₂O—C₆H₄—O—C₆H₅ | Compound 29 + NaO—C₆H₄—O—C₆H₅ |
| 56... | —CH₂O—C₆H₄—O—C₆H₄—SO₂Cl | Compound 55 + ClSO₃H |
| 57... | —CH₂OH | LiAlH₄ |
| 58... | —CH₂O(CH₂CH₂O)ₙH | compound (57) + n (ethylene oxide) |
| 59... | —CH₂O-(phenanthroline with R'₂ substituents) | compound (57) + Cl-(phenanthroline with R'₂ substituents) |
| 60... | —CH₂O-(bipyridine with R'₂ substituents) | compound (57) + Cl-(bipyridine with R'₂ substituents) |

| | -D_q-T_k | Reactant |
|---|---|---|
| 61 | (4-methoxypyridin-2-yl)(pyridin-2-yl) with R'₁ substituents, -CH₂O- linker | compound (57) + Cl-substituted bipyridine with R'₁ |
| 62 | -CH₂O- quinoline with B₁-E and R'₂ substituents | compound (57) + Cl- quinoline with B₁-E and R'₂ |
| 63 | -CH₂O- anthraquinone with B₁-E | compound (57) + Cl- anthraquinone with B₁-E |
| 64 | -CH₂O- benzoxazole with B₁ | compound (57) + Cl- benzoxazole with B₁ |
| 65 | -CH₂O- triazine with B₁-E substituents | compound (57) + Cl- triazine with B₁-E substituents |
| 66 | -CH₂O- pyrimidine with R'₁ substituents | compound (57) + Cl- pyrimidine with R'₁ substituents |
| 67 | -CH₂O- cyclohexane with B₁, H, R'₁ | compound (57) + Cl- cyclohexane with B₁, H, R'₁ |
| 68 | -CH₂O- cyclohexane with B₁, H, R'₁ | compound (57) + Cl- cyclohexane with B₁, H, R'₁ |
| 69 | -CH₂O- benzene with R'₁ substituents | compound (57) + Cl- benzene with R'₁ substituents |

| $-D_q-T_k$ | Reactant |
|---|---|
| 70... 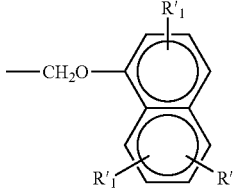 | compound (57) + 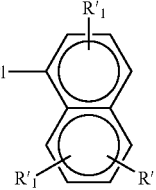 |
| 71... 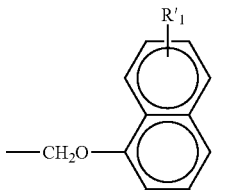 | compound (57) + 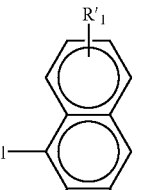 |
| 72... 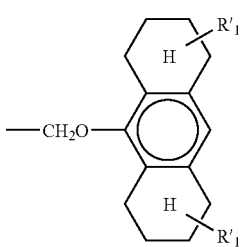 | compound (57) + 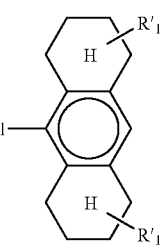 |
| 73... 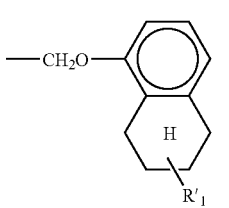 | compound (57) + 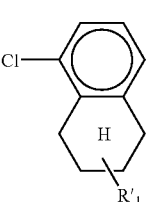 |
| 74...  —CH$_2$O—CH$_2$—CH(OH)—CH$_2$OH | compound (57) + 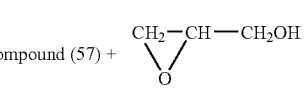 | wherein
E=C$_1$-C$_3$ alkyl;
R'$_1$=H or C$_1$-C$_3$ alkyl;
B$_1$=oxygen or sulphur;
R'$_2$=Cl, Br, H, C$_1$-C$_3$ alkoxy.

Many of the above reactions belong to the classic organic chemistry. See in particular U.S. Pat. No. 3,810,874 herein incorporated by reference and "Organic functional group preparations", S. Sandler and W. Karo, Second Edition, New York, Academic Press, 1968-72.

More particularly, the components (2) of formula (I) having terminal —CH$_2$OH can be prepared, for example, by reduction of the corresponding esters with reducing agents, as for example lithium aluminum hydride or sodium borohydride, in aprotic polar solvents by following the teachings of U.S. Pat. No. 6,509,509. Alternatively, they can be prepared by catalytic reduction of the corresponding carboxylic acids with hydrogen according to the patent application US 2004/0230080.

The components 2) of formula (I) having more than one end alcoholic functionality can be prepared, for example, by reaction of the —CH$_2$OH end group with glycidol by following the publication of Tonelli, Gavezzotti, Strepparola, J. Fluorine Chem., 95 (1999)-51-70.

The polymers of formula (I) with —CH$_2$OH can be used in nucleophilic reactions with haloalkanes or with chlorobenzyl or chloronaphthyl derivatives to obtain aromatic terminals. See to this purpose Tonelli, Gavezzotti, Strepparola, J. Fluorine Chem., 95 (1999)-51-70, U.S. Pat. No. 4,757,145 and U.S. Pat. No. 4,721,795 herein incorporated by reference.

When a solvent is used in step (a), an optional step (d) can follow to step (c) wherein the polymer (I) is recovered after solvent evaporation, preferably by distillation under vacuum.

Another further embodiment of the present invention is represented by the above polymeric compositions including a further additive as component 3). Surprisingly and unexpectedly the compositions of this embodiment show a synergic effect represented by components 2) and 3) bringing to an even more remarkable lowering of the die pressure and torque.

It is a further object of the present invention polymeric compositions comprising
1) a thermoprocessable semicrystalline halopolymer as defined above;
2) 0.01-10% by weight of 1), preferably between 0.05% and 5%, more preferably 0.1% and 3% by weight, of the additive of formula (I) as above defined;
3) 0.01-10% by weight of 1), preferably 0.1-6%, more preferably 0.5-3%, of a copolymer of TFE and one or more per(halo)fluorinated monomers in an amount of at least 0.5% by moles, having a dynamic viscosity lower than $1\times10^6$ Pa·sec, measured at 1 sec$^{-1}$ (shear rate) and at a temperature of 30° C. (±2° C.) over the polymer second melting temperature and provided that component 3) is different from component 1).

Preferably the sum of the amounts of 1), 2), 3) is 100% by weight.

Component 3) has a dynamic viscosity preferably lower than 2000 Pa·sec, more preferably lower than 700. The dynamic viscosity is generally measured with a controlled elongation rheometer, by using an actuator to apply a strain elongation to the sample and a transducer to measure the resulting strain developed inside the sample, by using parallel plates.

The per(halo)fluoromonomers are preferably selected from $C_3$-$C_8$ perfluoroolefins, for example hexafluoropropylene;
chlorine- and/or bromine- and/or iodine $C_2$-$C_6$ per(halo)fluoroolefins, for example chlorotrifluoroethylene;
per(halo)fluoroalkylvinylethers having formula $CF_2=CFORf_3$ wherein $Rf_3$ is a $C_1$-$C_6$ per(halo)fluoroalkyl, for example $CF_3$, $C_2F_5$, $C_3F_7$;
per(halo)fluoro-oxyalkylvinylethers of formula $CF_2=CFOX_{01}$, wherein $X_{01}$ is $C_1$-$C_{12}$ per(halo)fluoro-oxyalkyl having one or more ether bonds, for example perfluoro-2-propoxy-propyl;
per(halo)fluoro-methoxy-alkylvinylethers of formula $CF_2=CFOCF_2OR_{f4}$, wherein $R_{f4}$ is a $C_1$-$C_6$ per(halo)fluoroalkyl, for example $CF_3$, $C_2F_5$, $C_3F_7$, or a $C_1$-$C_6$ per(halo)fluorooxyalkyl having one or more ether groups, for example $CF_3O$—$C_2F_5$—;
per(halo)fluorodioxoles of formula

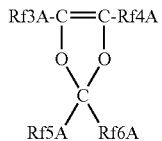

wherein Rf3A, Rf4A, Rf5A, Rf6A, equal to or different from each other, are independently fluorine, one $C_1$-$C_6$ perfluoroalkyl, optionally comprising one or more oxygen atoms, for instance —$CF_3$, —$C_2F_5$, —$C_3F_7$, —$OCF_3$, —$OCF_2CF_2OCF_3$.

Preferred component 3) is represented by copolymers of TFE with one or more of the following monomers:
perfluoroalkylvinylethers having formula $CF_2=CFOR_{fr}$ wherein $R_{fr}$ is a $C_1$-$C_6$ perfluoroalkyl, e.g. —$CF_3$, —$C_2F_5$, —$C_3F_7$;
perfluoro-oxyalkylvinylethers of formula $CF_2=CFOXo$, wherein Xo is $C_1$-$C_{12}$ perfluoro-oxyalkyl having one or more ether groups, for example perfluoro-2-propoxy-propyl;
$C_3$-$C_8$ perfluoroolefins, for example hexafluoropropylene;
per(halo)fluorodioxoles of formula

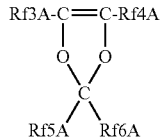

wherein Rf3A, Rf4A, Rf5A, Rf6A, equal to or different from each other, are independently fluorine, one $C_1$-$C_6$ perfluoroalkyl group, optionally comprising one or more oxygen atoms, for instance —$CF_3$, —$C_2F_5$, —$C_3F_7$, —$OCF_3$, —$OCF_2CF_2OCF_3$, preferably a per(halo)fluorodioxole as described above wherein Rf3A and Rf4A are fluorine atoms, Rf5A and Rf6A are perfluoromethyl groups (—$CF_3$) [perfluoro-2,2-dimethyl-1,3-dioxole (FDD)], or wherein Rf3A, Rf5A and Rf6A are fluorine atoms and Rf4A is a perfluoromethoxy group (—$OCF_3$) [2,2,4-trifluoro-5-trifluoromethoxy-1,3-dioxole or perfluoromethoxy-dioxole (MDO)].

Still more preferred component 3) is TFE copolymers comprising units derived from at least one perfluoroalkylvinylether (PAVE) of formula $CF_2=CFORfr$, wherein Rfr is a $C_1$-$C_6$ perfluoroalkyl, preferably —$CF_3$, —$C_2F_5$, —$C_3F_7$, more preferably $CF_3$. The TFE/PAVE copolymers can also contain other per(halo)fluoromonomer, in particular perfluoro-oxyalkylvinylethers, and/or $C_3$-$C_8$ perfluoroolefins as described above (e.g. hexafluoropropylene), and/or per(halo)fluorodioxoles as above described.

The preferred component 3) consists essentially of TFE/PAVE copolymer.

The TFE/PAVE copolymer can comprise other "moieties" as terminal ends, defects, which do not substantially modify the properties of the polymer. The TFE/PAVE has preferably melting temperature lower than 250° C. and a dynamic viscosity lower than 10 Pa·sec, more preferably lower than 8 Pa·sec, still more preferably lower than 6 Pa·sec, measured at a temperature of 280° C. and at a shear rate of 1 rad·sec$^{-1}$. The dynamic viscosity is determined here according to ASTM D 4440, by following the equations reported in Practice ASTM D 4065 to determine "Complex viscosity, rf" at 1 rad·sec$^{-1}$. The dynamic viscosity is generally measured by the previously described method.

Preferably the component 3) is a copolymer consisting essentially of units derived from TFE and MVE. More preferably this copolymer consists essentially of:
from 3 to 25% by moles, preferably from 5 to 20% by moles, more preferably from 8 to 18%, still more preferably from 10 to 15% by moles of units derived from MVE; and
from 97 to 75% by moles, preferably from 95 to 80%, more preferably from 92 to 82%, still more preferably from 90 to 85% by moles of units derived from TFE.

In this embodiment comprising 1), 2), 3), component 1) is preferably a copolymer of ethylene (E) with chlorotrifluoroethylene (CTFE) and/or tetrafluoroethylene (TFE), optionally containing one or more hydrogenated and/or fluorinated comonomers. Particularly preferred compositions are:
(a) from 35 to 65%, preferably from 45 to 55%, more preferably from 48 to 52% by moles of ethylene (E);
(b) from 65 to 35%, preferably from 55 to 45%, more preferably from 52 to 48% by moles of chlorotrifluoroethylene (CTFE) (for the ECTFE polymers) and/or tetrafluoroethylene (TFE) (for the ETFE polymers);
and optionally comprising hydrogenated and/or fluorinated comonomers as indicated above under (c1), (c2), in amounts preferably 0, 1-10%, more preferably 0, 2-5%, with respect to the total content of (a) and (b).

Among the polymers of the component 1) ECTFE or ECTFE containing additional fluorinated comonomers (c1) is more preferred Preferably component 2) has the block B deriving from one or more perfluorinated olefins, more preferably from TFE, and (j+j') is higher than 5. When the component Q, Q' are functional end groups, preferably they do not contain aromatic groups and Tk, Tk' contain only C, O, H, F atoms, more preferably the oxygen is in OH form.

The compositions of this embodiment can be prepared, for example, as follows:
I) mixing component 2) with component 3);
II) melting, homogenizing and cooling the blend obtained in I);
III) milling the solid blend obtained in II) until obtaining a powder;
IV) addition of component 1) to the powder obtained in III), mixing and extrusion.

The Applicant has found that the solid blend of 2)+3) under powder form, obtainable in step III) is very advantageous in the mixing step with the component 1), in particular when component 2) is a waxy solid or a highly viscous liquid at room temperature.

More particularly:
I) components 2) and 3) are mixed in powder form in a quick mixer;
II) the blend obtained in 1) is extruded in a twin-screw extruder having a temperature profile 180-250° C. between the feeding and the extruder die and then the extruded products;
III) the extruded obtained in II) are milled at room temperature obtaining a powdery mixture;
IV) the powdery mixture in III) is mixed with component 1) in pellet or powder, preferably in powder form, in a quick mixer or in a rotary blend, extruding then the blend.

The particles of the powdery mixture obtained in III) have a size of less than 1000 μm for at least preferably 80% wt, more preferably 90% wt. The compositions obtained in these embodiment are used to obtain manufactured articles as defined above.

Some illustrative examples but not limitative of the present invention follow.

EXAMPLES

Characterization

The methods used to characterize the compound (I) are the following:
NMR
The NMR spectra have been recorded by using a Variant Mercury 200 MHz spectrometer by using $CFCl_3$ as internal reference for the $^{19}F$-NMR analyses and tetramethylsilane (TMS) as reference for the $^{1}H$-NMR analyses. Hexafluorobenzene is also used as solvent for the sample. The NMR measurement allows to determine the number average length of the polyolefinic block B, B', the z, z' indexes and the number average molecular weight of the compound of formula (I).

DSC
The thermal transitions, as Tg and melting temperature, have been determined with the Perkin Elmer® DSC-2C instrument by using the following procedure: cooling from 20° C. to −170° C. at 80° C. min$^{-1}$ and heating at 20° C. min$^{-1}$ from −170° C. to 350° C. under nitrogen flow.
Melt Flow Index
It has been measured by using the ASTM D-1238 method.
Thermogravimetric Analysis (TGA)
It is carried out with dynamic modality in nitrogen in a temperature range between 30° C. and 750° C. by heating with a rate of 10° C./min.
Determination Peroxidic Content (PO)
The analysis of the peroxide content has been carried out by iodometric titration, according to the following method. A weighed amount of sample (some grams) is dissolved in about 20 ml of Galden® ZT130. 1 ml of glacial acetic acid and 30 ml of a sodium iodide solution at 5% w/w in isopropyl alcohol are added. The resulting suspension is left under stirring for 15 minutes and the iodine developed from the reaction with the peroxide is titred with an aqueous solution of sodium thiosulphate having a known titre, by using the Mettler® DL 40 device for the potentiometric titration, equipped with platinum electrode and reference electrode. The sensitivity limit for the PO determination is 0.0002.

Preparation of the Component 2) of Formula (I)

Example 1

Preparation of the Additive (I) Containing Segments from TFE

In a 1 liter glass flask, equipped with sonde for the temperature, mechanical stirring, bulling inlet for the nitrogen and/or tetrafluoroethylene adduction, 600 g of Galden® HT230 and 300 g of a peroxidic perfluoropolyether of class (A) are introduced, having formula:

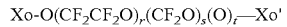
$Xo-O(CF_2CF_2O)_r(CF_2O)_s(O)_t-Xo'$ wherein Xo and Xo' are: —$CF_3$ (29%), —$CF_2Cl$ (13%), —$CF_2CF_2Cl$ (20%), —COF (24%), —$CF_2COF$ (14%), with number average molecular weight equal to 5.8·10$^4$, r/s=1.25 and t/(r+s)=0.077 and having a PO equal to 1.3 [defined as g of active oxygen (MW=16)/100 g of perfluoropolyether peroxide].

The reaction mixture is heated under stirring and under nitrogen flow (1 Nl h$^{-1}$) up to 190° C., temperature at which the nitrogen feeding is closed and that of tetrafluoroethylene (TFE) opens with a flow rate equal to 8.5 Nl h$^{-1}$.

The mixture is maintained under stirring at 190° C. for 1.5 hours, then brought to 200° C. and maintained at this temperature for 1.5 hours and finally, increased to 210° C. for one hour.

The ratio between the total TFE moles fed and the moles of peroxidic units initially fed is equal to 7.

The TFE feeding is interrupted, that of nitrogen 1 Nl h$^{-1}$) opens and the temperature is increased up to 230° C. and maintained constant for 3 hours.

At the end of the thermal treatment the mixture is left cool up to room temperature. The mixture results to be an homogeneous solution not separating in the time.

In the reaction mixture, maintained under stirring at 180° C., nitrogen saturated with water (10 Nl h$^{-1}$) is bubbled for 4 hours, at the end of which a treatment with anhydrous nitrogen (10 Nl h$^{-1}$) is carried out for 30 minutes before passing to the treatment with fluorine (4 Nl h$^{-1}$ for a total of 7 hours, T=170° C.) always under stirring. At the end of the fluorination, nitrogen (10 Nl h$^{-1}$) is fed for 30 minutes for degassing the equipment.

An aliquot of the mixture is drawn and subjected to acidity measurement, which results lower than the sensitivity limit of the method.

By distillation under vacuum at 10$^{-1}$ mbar (maximum T in kier=230° C.) the solvent Galden® HT230 is removed, obtaining 330 g of product which is characterized by $^{19}$F-NMR analysis, confirming the following structure:

Q-O-[A-B]$_z$-A-Q'     (I)

wherein
Q, Q' are for about 70% molar formed of CF$_3$, while the remaining part is CF$_2$Cl, CF$_2$CF$_2$Cl,
B is —[CF$_2$—CF$_2$]$_j$ wherein j has a number average value equal to 6.7 wherefore the number average length of the segment B is of 13.5 carbon atoms;
A=—(CF$_2$)O—[(CF$_2$O)$_n$(CF$_2$CF$_2$O)$_m$(CF$_2$CF$_2$CF$_2$O)$_p$(CF$_2$CF$_2$CF$_2$CF$_2$O)$_q$—](CF$_2$)$_b$—with values of m/n=1.08, p/n=0.014, q/n=0.020; (p+q)/(p+q+n+m)=0.016,
wherein b=0 when A is linked to Q', b=1 in all the other cases, wherein the (CF$_2$CF$_2$CF$_2$O) and (CF$_2$CF$_2$CF$_2$CF$_2$O) units are assumed as generated from the recombination of alkyl radicals formed during the decomposition of the peroxidic units since the total amount of said unit is substantially similar to that generated during the thermal treatment of the peroxidic perfluoropolyether (PFPE) in the absence of olefins.

The percentage by weight of the perfluorocarbon segments B in the compound of formula (I) is equal to 21.4%. The number average molecular weight of the polymer results equal to 6.4·10$^4$, from which an average value of the index z=20 is calculated.

The DSC analysis shows a Tg equal to −113° C. The analysis at DSC shows a melting ΔH of 3.1 J/g by effecting the calculation in a temperature range between 50 and 200° C.

The TGA analysis shows that at 305° C. the obtained polymer has a loss by weight equal to 1%; at 362° C. the polymer has a weight loss of 2%.

Example 2

A blend has been prepared between the polymer ethylene/chlorotrifluoroethylene (E/CTFE, 45/55 by moles), having a second melting temperature (TmII) of 222° C. and a second melting enthalpy (ΔH) equal to 34.8 J/g, in the pellet form, having a Melt Flow Index of 1 g/10 min at 275° C. and a load of 5 kg, and 2% by weight of the additive of the Example 1 by using a rotary blend for 5 hours at room temperature.

The obtained mixture was introduced in a Hastelloy C-266 conical twin-screw low shear extruder having a diameter of 18 mm.

The temperature profile in the extruder ranges from 200° C. up to 276° C. in the extruder head. The obtained data of pressure vs. flow-rate are indicated in Table 1.

TABLE 1

| Pressure (bar) | Flow-rate (kg/h) | Torque (N · m) |
|---|---|---|
| 0.8 | 2.4 | 6 |
| 0.8 | 4.9 | 5 |
| 2 | 7.3 | 8 |

The sample was then subjected to mechanical tests, the results of which relating to the elastic modulus, yield stress, strain at yield, stress at break, strain at break are reported in Table 3.

Example 3

Comparative

The Example 2 was repeated but by using only ECTFE.

The obtained data of pressure vs. flow-rate are indicated in Table 2.

TABLE 2

| Pressure (bar) | Flow-rate (kg/h) | Torque (N · m) |
|---|---|---|
| 31 | 2.1 | 64 |
| 48 | 4.3 | 95 |
| 60 | 6.5 | 108 |

The sample was then subjected to mechanical tests, the results of which relating to the elastic modulus, yield stress, strain at yield, stress at break, strain at break are reported in Table 3.

TABLE 3

| | Elastic Modulus (Mpa) | Yield stress (MPa) | Strain at yield (%) | Stress at break (Mpa) | Strain at break (%) |
|---|---|---|---|---|---|
| Ex. 2 | 1570 | 34.6 | 3.5 | 59.2 | 249 |
| Ex. 3 (comp) | 1600 | 34.2 | 3.5 | 63.6 | 261 |

The comparison of the data of the Examples 2 and 3 (comparative) shows that, the flow-rate being equal, the pressure measured in the extruder die results much lower for the composition of the present invention with respect to the polymer as such. Also the torque shows the same progress. Furthermore no slippage phenomena in the extruder have been observed notwithstanding the additive is present at 2% by weight in the ECTFE polymer.

The data of Table 3 show furthermore that the additive of the present invention, component 2), is effective in reducing the pressure and/or the torque without modifying the mechanical properties of the non additivated polymer.

Example 4

A high density polyethylene blend in pellets (HDPE Eltex®) was prepared, having a Melt Flow Index of 0.44 g/10' at 190° C. with a 5 kg load, containing 0.6% by weight of the additive of Example 2 at room temperature.

The obtained mixture was fed into a Hastelloy C-266 conical twin-screw extruder having a 18 mm diameter. The temperature profile in the extruder ranges from 100° C. up to 195° C. in the extruder head. The obtained data of torque vs. flow-rate are reported in Table 4.

TABLE 4

| Torque (N·m) | Flow-rate (kg/h) |
|---|---|
| 61 | 4.5 |
| 60 | 2.9 |
| 56 | 1.4 |

Example 5

Comparative

The Example 4 was repeated but using only polyethylene. The obtained data of torque vs. flow-rate are reported in Table 5.

TABLE 5

| Torque (N·m) | Flow-rate (kg/h) |
|---|---|
| 87 | 3.5 |
| 84 | 2.4 |
| 73 | 1.2 |

The comparison of the data of the Examples 4 and 5 (comparative) shows that, the flow-rates being substantially equal, the torque results lower for the composition of the present invention with respect to the non additivated polymer as such.

Example 6

Preparation of the Mixture 2)+3)

4840 g of the component 3) formed of a TFE/MVE copolymer (containing 13% by moles of MVE and 87% by moles of TFE) and having a dynamic viscosity, of 5 Pa·sec measured at 280° C. and at a shear rate of 1 rad·sec$^{-1}$, having a second melting temperature of 205.9° C., a second melting (ΔH) of 6.279 J/g, are introduced in a 40 liter Henschel mixer. Then 660 g of the component 2) formed of the additive of Example 1 are fed in the mixer under stirring of 300 rpm by maintaining the mixture under stirring for 3 minutes. The obtained mixture is then extruded in a twin screw extruder having an homogeneous temperature profile of about 200° C. The obtained extruded products are collected and then milled in FRITCH (PULVERISETTE 14) mill obtaining a powder mixture having the following particle size (sieving data):

| | |
|---|---|
| retained 850μ | 0.0% |
| retained 500μ | 1.2% |
| retained 355μ | 5.3% |
| retained 250μ | 8.5% |
| retained 106μ | 26.7% |
| retained 45μ | 36.0% |
| pass 45μ | 22.3% |

These data have been obtained with a GRADEX 2000 apparatus.

The so obtained mixture is formed of 12% by weight of the component 2) and of 88% by weight of the component 3).

Preparation of the Mixture 1)+2)+3)

A composition was prepared, formed of:

98.53% by weight of ethylene/chlorotrifluoroethylene (E/CTFE, 45/55 by moles) of Example 2 in pellet form;

1.47% by weight of the mixture 2)+3) previously prepared by mixing the components in a rotary blend for 5 hours at room temperature.

The obtained mixture (98.53% of ECTFE, 0.18% component 2), 1.29% component 3)) was introduced in a Hastelloy C-266 conical twin-screw low shear extruder having a diameter of 18 mm.

The temperature profile in the extruder ranges from 200° C. up to 276° C. in the extruder head. The obtained data of pressure vs. flow-rate are indicated in Table 6.

TABLE 6

| Pressure (bar) | Flow-rate (kg/h) | Torque (N·m) |
|---|---|---|
| 10 | 3 | 20 |
| 20 | 6 | 26 |
| 31 | 8.8 | 36 |

Example 7

Comparative

A composition was prepared, formed of:

98.7% by weight of ethylene/chlorotrifluoroethylene (E/CTFE, 45/55 by moles) of Example 2 in pellet form;

1.3% by weight of the component 3) in the powder form;

by mixing the components in a rotary blend for 5 hours at room temperature.

The obtained mixture was introduced in a Hastelloy C-266 conical twin-screw low shear extruder having a diameter of 18 mm.

The temperature profile in the extruder ranges from 200° C. up to 276° C. in the extruder head. The obtained data of pressure vs. flow-rate are indicated in Table 7.

TABLE 7

| Pressure (bar) | Flow-rate (kg/h) | Torque (N·m) |
|---|---|---|
| 19 | 2.3 | 45 |
| 32 | 5 | 50 |
| 40 | 7.6 | 54 |

Example 8

A composition was prepared, formed of:

99.7% by weight of ethylene/chlorotrifluoroethylene (E/CTFE, 45/55 by moles) of Example 2 in pellet form;

0.3% by weight of the component 2) of Example 1 in the powder form; by mixing the components in a rotary blend for 5 hours at room temperature.

The obtained mixture was introduced in a Hastelloy C-266 conical twin-screw low shear extruder having a diameter of 18 mm.

The temperature profile in the extruder ranges from 200° C. up to 276° C. in the extruder head. The obtained data of pressure vs. flow-rate are indicated in Table 8.

TABLE 8

| Pressure (bar) | Flow-rate (kg/h) | Torque (N·m) |
|---|---|---|
| 22.5 | 3 | 36 |
| 39 | 6 | 39 |

The comparison of the data of example 6 with those of example 8 shows that the addition of the component 3) allows to further lower the pressure of about 50%, the flow-rate being equal.

The invention claimed is:

1. Polymeric compositions comprising:
1) at least one thermoprocessable semicrystalline halopolymer;
2) 0.01%-10% by weight of 1) of an additive formed of one or more (per)fluoropolyether polymers of formula $$Q\text{-}O\text{-}[A\text{-}B]_z\text{-}[A\text{-}B']_{z'}\text{-}A\text{-}Q' \qquad (I)$$

wherein:

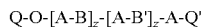

wherein A' is a perfluoropolyether chain comprising one or more repeating units selected from the group consisting of $(CF_2O)$, $(CF_2CF_2O)$, $(CF_2CF_2CF_2O)$, $(CF_2CF_2CF_2CF_2O)$, $(CF(CF_3)O)$, $(CF(CF_3)CF_2O)$, and $(CF_2CF(CF_3)O)$; X, X', equal to or different from each other, are $-CF_2-$, $-CF_2CF_2-$, or $-CF(CF_3)-$;
a, b, equal to or different from each other, are integers equal to 0 or 1 with the proviso that the block A linked to the Q-O— end group has a=1 and the block A linked to the Q' end group has b=0;
B is a block formed of units deriving from one or more olefins,
wherein at least one of B is homopolymerizable by radical route, and of formula:

$$-[(CR_1R_2-CR_3R_4)_j(CR_5R_6-CR_7R_8)_{j'}]- \qquad (Ia)$$

wherein
j is an integer from 1 to 30, j' is an integer from 0 to 29, with the proviso that (j+j') is higher than 2 and lower than 30; $R_1$, $R_2$, $R_3$, $R_4$, $R_5$, $R_6$, $R_7$, $R_8$, equal to or different from each other, are selected from halogen; H, $C_1$-$C_6$ (per) haloalkyl,
wherein the halogen is F, or Cl; $C_1$-$C_6$ alkyl, optionally containing heteroatoms; $C_1$-$C_6$ oxy(per)fluoroalkyl; said substituents $R_1$-$R_8$ optionally containing one or more functional groups;
B' is a block deriving from one or more olefins and has formula (Ia) but having at least one among the $R_1$-$R_8$ substituents has a meaning different from that in B, (j+j') being higher than or equal to 2 and lower than 30;
z is an integer higher than or equal to 2; z' is 0 or an integer; z, z' are such that the number average molecular weight of the polymer of formula (I) is between 500 and 500,000;
Q and Q', equal to or different from each other, are selected from non functional perfluoroalkyl end groups from 1 to 3 carbon atoms, one fluorine atom can be substituted by one chlorine or hydrogen atom, $C_1$-$C_6$ non fluorinated alkyls; from functional end groups -(CFW)-D$_q$-T$_k$ wherein W=F, $CF_3$, k is an integer ranging from 1 to 4, q is equal to 0 or 1, D is a bridging group, and the group T$_k$ is selected from the group consisting of $-SH$, $-SR'$, $-NR'_2$, $-SiR'_d$ $L_{3-d}$, wherein L is an OR' group, d is an integer between 0 and 3, $-CN$, $-NCO$, $-CH=CH_2$,

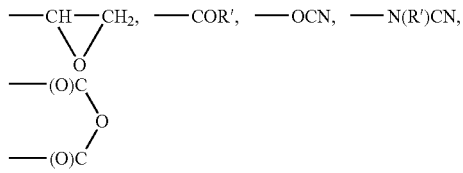

$-CHO$, $-CH(OCH_3)_2$, $-C(OCH_3)=NH$, $-C(NH_2)=NH$, $-CH(OH)CH_2OH$, $-CH(CH_2OH)_2$, $-CH(COOH)-CH(COOR')_2$, $-CH(CH_2NH_2)_2$, $-NH_2$, $-NHR'$, $-N(R')_2$, $-CH(CN)_2$, $-CH(CH_2OCH_2CH=CH_2)_2$, $-C(OH)_2CF_3$, $-OH$, $-CH_2OH$; $-COY$ with $Y=OH$, $OR'$, $CF_3$, $NH_2$, $NHR'$, $NR'R''$, or halogen; wherein R', R'' are an alkyl, cycloaliphatic or aromatic group, R', R'' optionally containing fluorine; an aryl radical formed of one or more aromatic rings, optionally condensed; and an heterocyclic radical.

2. The compositions according to claim 1, wherein the component 1) is selected from the group consisting of:
(a) TFE copolymers with ethylene, and/or propylene and/or isobutylene, optionally containing one or more comonomer, in amounts 0.1-30% by moles;
(b) polyvinilydenfluoride optionally containing of one or more comonomers, in amounts between 0.1% and 15% by moles;
(c) polychlorotrifluoroethylene optionally containing of one or more comonomers, generally in amounts between 0.1% and 10% by moles;
(d) polymers of chlorotrifluoroethylene (CTFE) with ethylene (E), optionally propylene or isobutylene in addition or in substitution of E; optionally said polymers containing one or more other comonomer, in amounts between 0.1% and 30% by moles with respect to the total amount of E+CTFE;
(e) polyvinylchloride (PVC) polymers, chlorinated polyvinylchloride (CPVC), polivinylidene chloride (PVDC), the polymers optionally containing one or more monomers; and
(f) TFE polymers with one or more fluorinated monomers, in amounts between 0.1% and 10% by moles, selected from the group consisting of hexafluoropropene, and perfluoroalkylvinylethers.

3. The compositions according to claim 1, wherein the component 1) is a fluoropolymer containing hydrogen atoms.

4. The compositions according to claim 1, wherein the component 2) is a polymer of formula (I) having a second melting enthalpy (ΔH) higher than 1 J/g according to the ASTM D 3418 method.

5. The compositions according to claim 1, wherein Q and Q' of the component 2), equal to or different from each other, are $-CF_3$, $-C_2F_5$, $-C_3F_7$, $-CF_2H$, $-CF_2CF_2H$, $-CFHCF_3$, $-CF_2Cl$, $-C_2F_4Cl$, $-CH_3$, $-C_2H_5$, or $C_3H_7$.

6. The compositions according to claim 1, wherein in formula (I) of the component 2), block B derives from one or more homopolymerizable olefins by radical route, selected from the group consisting of tetrafluoroethylene (TFE), ethylene (E), vinylidene fluoride (VDF), and chlorotrifluoroethylene (CTFE), optionally in the presence of other non homopolymerizable olefins by radical route selected from the group consisting of hexafluoropropene (HFP), and (per)fluorovinylethers.

7. The compositions according to claim 6, wherein in the component 2), B and B' contain units deriving from tetrafluoroethylene (TFE).

8. The compositions according to claim 1, wherein in the component 2), A is selected from the following structures:

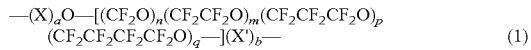

wherein
X, X', equal to or different from each other, are —$CF_2$—, —$CF_2CF_2$—;
a, b, are as defined above; m, n, p, q are integers, zero comprised, such that m/n is between 0.1 and 10 when n is different from zero; (p+q)/(n+m+p+q) is between 0 and 0.05, (n+m+p+q) being different from 0; or

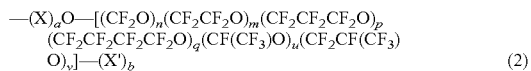

wherein
X, X', equal to or different from each other, are —$CF_2$—, —$CF(CF_3)$—, or —$CF_2CF_2$—;
a, b, are as defined above;
m, n, p, q, u, v are integers, including zero, such that (p+q)/(v+m) is between 0 and 0.05 when (v+m) is different from zero; v/(n+m+u) is lower than 50 when (n+m+u) is different from zero.

9. The compositions according to claim 1, wherein the amounts of the component 2) is 0.05%-5% by weight.

10. A process for preparing the compositions according to claim 1 comprising the mixing of the components 1) and 2), with optional granulating to obtain pellets, and extruding.

11. The process according to claim 10, wherein the components 1) and 2) are mixed in solid form.

12. Compositions as defined in claim 1, wherein the component 1) is replaced by a polyolefin selected from the group consisting of polypropylene (PP), polyethylene (PE) having a high and low density, ethylene copolymers, and propylene copolymers, optionally containing a dienic monomer.

13. The compositions according to claim 1 further comprising
3) 0.01-10% by weight of 1) of a copolymer of TFE and one or more per(halo)fluorinated monomers in an amount of at least 0.5% by moles, having a dynamic viscosity lower than $1 \times 10^6$ Pa·sec, measured at 1 sec$^{-1}$ (shear rate) and at a temperature of 30° C. (±2° C.) over the polymer second melting temperature and provided that the component 3) is different from the component 1).

14. The compositions according to claim 1, wherein the component 1) is a thermoprocessable semicrystalline copolymer of ethylene (E) with chlorotrifluoroethylene (CTFE) and/or tetrafluoroethylerie (TFE), optionally containing one or more hydrogenated and/or fluorinated comonomers.

15. The compositions according to claim 13, wherein the component 3) is a copolymer of TFE with one or more of the following monomers:
perfluoroalkylvinylethers having formula $CF_2$=$CFOR_f$, wherein $R_f$ is a $C_1$-$C_6$ perfluoroalkyl;
perfluoro-oxyalkylvinylethers of formula $CF_2$=CFOXo, wherein Xo is $C_1$-$C_{12}$ perfluoro-oxyalkyl having one or more ether group;
$C_3$-$C_8$ perfluoroolefins; or
per(halo)fluorodioxoles of formula

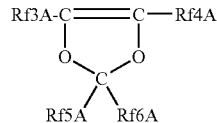

wherein Rf3A, Rf4A, Rf5A, Rf6A, equal to or different from each other, are independently fluorine, or one $C_1$-$C_6$ perfluoroalkyl group, optionally comprising one or more oxygen atoms.

16. The compositions according to claim 13, wherein the component 3) is a copolymer consisting essentially of:
from 3 to 25% by moles of units derived from perfluoromethylvinylether (MVE); and
from 97 to 75% by moles of units derived from TFE.

17. A process for preparing the compositions of claim 13, comprising:
I) mixing of the component 2) with the component 3);
II) melting, homogenizing and cooling the blend obtained in I);
III) milling the solid blend obtained in II) until obtaining a powder; and
IV) addition of the component 1) to the powder obtained in III), mixing and extruding.

18. A method of use of the compositions according to claim 1 comprising manipulating the compositions to form manufactured article selected from the group consisting of pipes, films, sheets, cables, and filaments.

* * * * *